United States Patent
Tsuritani et al.

(10) Patent No.: US 7,480,458 B2
(45) Date of Patent: Jan. 20, 2009

(54) LINK SYSTEM FOR PHOTONIC CROSS CONNECT AND TRANSMISSION APPARATUS

(75) Inventors: Takehiro Tsuritani, Fujimino (JP); Tomohiro Otani, Fujimino (JP)

(73) Assignee: KDDI Corporation, Tokyo (JP)

( * ) Notice: Subject to any disclaimer, the term of this patent is extended or adjusted under 35 U.S.C. 154(b) by 164 days.

(21) Appl. No.: 11/341,604

(22) Filed: Jan. 30, 2006

(65) Prior Publication Data
US 2006/0177219 A1 Aug. 10, 2006

(30) Foreign Application Priority Data
Feb. 9, 2005 (JP) ............... 2005-033060

(51) Int. Cl.
H04B 10/00 (2006.01)
H04J 14/00 (2006.01)
(52) U.S. Cl. .................... 398/1; 398/5; 398/45
(58) Field of Classification Search .............. 398/1, 398/3, 5, 45, 46, 51
See application file for complete search history.

(56) References Cited

U.S. PATENT DOCUMENTS

| | | | |
|---|---|---|---|
| 6,778,725 B1* | 8/2004 | Kakizaki et al. ............... 385/16 |
| 2003/0137932 A1* | 7/2003 | Nishioka et al. ............ 370/216 |
| 2004/0170165 A1* | 9/2004 | Maciocco et al. ........... 370/389 |
| 2005/0063701 A1* | 3/2005 | Ovadia et al. ................. 398/45 |
| 2005/0089027 A1* | 4/2005 | Colton ....................... 370/380 |
| 2007/0081451 A1* | 4/2007 | Fujimori et al. ............. 370/227 |

OTHER PUBLICATIONS

A. Fredette, et al., "Link Management Protocol (LMP) for Dense Wavelength Division Multiplexing (DWDM) Optical Line Systems", Oct. 2005, pp. 1-16, Network Working Group.
"Postdeadline Papers", pp. 3, FC:04 Optical Fiber Communication Conference & Exposition, Technical Conference: Feb. 22-27, 2004 Exposition: Feb. 24-26, 2004, Los Angeles Convention Center, Los Angeles, CA.
Shoichiro Asano, et al. "Field test of GMPLS all-optical path rerouting", PDP2, pp. 3, © 2004 Optical Society.
T. Otani, et al., "Interworking DWDM Equipment and PXC Operation using GMPLS for Reliable Optical Network", PDP3, pp. 3.

* cited by examiner

Primary Examiner—Dalzid Singh
(74) Attorney, Agent, or Firm—Westerman, Hattori, Daniels & Adrian, LLP.

(57) ABSTRACT

Between photonic cross connects (PXCs) 3 and 4, an in-use system path passing through transmission apparatus (WDMs) 5 and 7 are set, and a backup system passing through transmission apparatus (WDMs) 6 and 8 is set. The WDMs 3 and 4 link to the PXCs 5 and 7 and release masking therebetween when the in-use system path is set, and set masking therebetween when the in-use system path is deleted. The WDMs 5 and 7 included in the in-use system path transmit an alarm to a monitoring system when an input light is turned off, and the WDMs 6 and 8 included in the backup system path do not transmit an unintended alarm to the monitoring system even when the input light is turned off.

4 Claims, 4 Drawing Sheets

LINK SYSTEM FOR PHOTONIC CROSS CONNECT AND TRANSMISSION APPARATUS

BACKGROUND OF THE INVENTION

1. Field of the Invention

The present invention relates to a link system for photonic cross connect and transmission apparatus, and in particular, to a link system for photonic cross connect and transmission apparatus which enables highly reliable and highly efficient operation of an optical network.

2. Description of the Related Art

Lines in GMPLS optical networks using photonic cross connect (PXC) include a line of an in-use system being currently used in which optical signal from client apparatus is inserted and a line of a backup system maintained for backup without optical signal inserted therein (except for 1+1 protection).

In a transmission apparatus such as a wavelength division multiplexed apparatus (hereinafter, referred to as WDM), considering detection of an error between a PXC and a WDM depending on whether light is inputted from the PXC, light is not inputted from the PXC into the WDM that forms the backup system, so that it cannot be distinguished whether light is not inputted due to an error between the PXC and WDM or light is not inputted due to the backup system between the PXC and WDM. Therefore, it is not possible to detect an error between the PXC and WDM by detecting whether light is inputted from the PXC into the WDM. To avoid this problem, conventionally, error alarms between PXC and WDM have been all masked and errors between the PXC and WDM have been ignored.

However, in the above conventional method, error alarms between the PXC and WDM are all masked and errors between the PXC and WDM are all ignored, so that an operator cannot determine errors between the PXC and WDM and cannot quickly cope with errors.

SUMMARY OF THE INVENTION

An object of the invention is to solve the above problems and provide a link system for PXC and WDM which can determine errors between the PXC and the WDM and enable highly reliable and highly efficient operation of optical networks.

In order to accomplish the object, the first feature of this invention is that a link system for photonic cross connect and transmission apparatus in an optical network in which an in-use system path and a backup system path are set, wherein when an in-use system path is set based on an in-use system path setting request signal containing an in-use system path switching set signal, photonic cross connect and transmission apparatus included in the in-use system path links to each other and releases masking there between, and when an in-use system path is deleted based on an in-use system path delete request signal, photonic cross connect and transmission apparatus included in the deleted in-use system path links to each other and sets masking therebetween.

Also, the second feature of this invention is that the link system for photonic cross connects and transmission apparatus, wherein the transmission apparatus has a function of detecting a link error between the transmission apparatus by GMPLS protocols, and prohibits switching to a backup system path when the link error is in the backup system path.

As a basic construction of an optical network to which the invention is applied, photonic cross connect or client terminal to be externally connected to photonic cross connect has a redundant construction.

According to the invention, a WDM recognizes whether itself is of an in-use system or a backup system by linking to a PXC, and when it recognizes that it is of an in-use system, it releases masking. Herein, when light is not inputted from the PXC into the WDM, the WDM detects this as an error between the PXC and WDM, transmits an error alarm to a monitoring system, and notifies the PXC of the error.

When the WDM recognizes that itself is of a backup system, it sets masking. In the backup system, light is not inputted into the WDM from the PXC, however, the WDM does not detect this as an error, so that it does not transmit an unintended alarm to the monitoring system.

Thereby, it becomes possible to determine an error between the PXC and WDM and quickly cope with the error, whereby enabling efficient operation of the optical network.

When the WDM link to the PXC on an NMS or EMS is managed and operated, it is possible to indicate whether the WDM link is in operation or not by using a management protocol such as SNMP or TL 1, whereby enabling efficient operation.

Furthermore, the backup system with a link error can be prevented from being switched to be an in-use system, so that wasteful switching is prevented and efficient operation of the optical network is realized.

DETAILED DESCRIPTION OF THE PREFERRED EMBODIMENT

Figure 1:
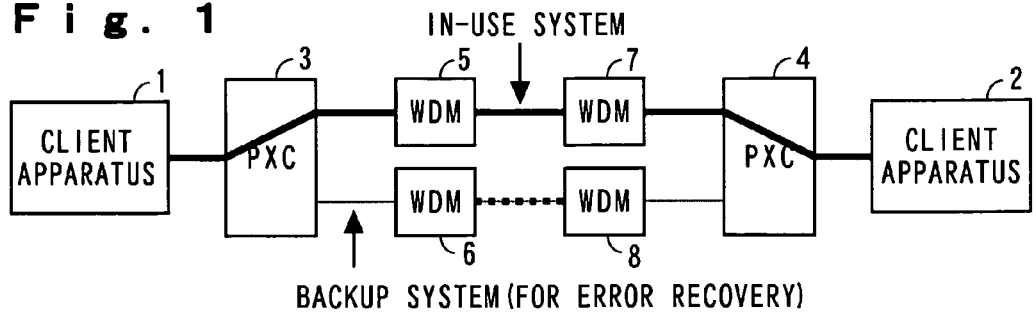
FIG. 1 is a block diagram of a basic construction of an optical network to which the invention is applied.

Hereinafter, the invention is explained with reference to the drawings. FIG. 1 is a block diagram of a basic construction of an optical network to which the invention is applied. The basic construction of the network is an example in which PXC has a redundant construction and the PXC is used as wavelength path initiator node. PXCs 3 and 4 are respectively connected to client apparatuses 1 and 2, transmission apparatus (hereinafter, referred to as WDMs) 5 and 6 are connected to the PXC 3, and WDMs 7 and 8 are connected to the PXC 4. The client apparatuses 1 and 2 are routers or L2 switches, etc.

For example, when an in-use system wavelength path is set to PXC 3—WDM 5—WDM 7—PXC 4 and a backup system (for error recovery) wavelength path is set to PXC 3—WDM 6—WDM 8—PXC 4, the PXCs 3 and 4 transmit an optical signal from the client apparatus 1 to the client apparatus 2 through the in-use system. In FIG. 1, the in-use system is shown by a thick solid line, and the backup system is shown by a dashed line. The optical signal passes through the in-use system, and no optical signal passes through the backup system. However, light containing no information passes between the WDMs 6 and 8 (thick dashed line).

Herein, when an error is detected in the in-use system, the PXCs 3 and 4 switch to the backup system so as to transmit the optical signal from the client apparatus 1 to the client apparatus 2.

Figure 2:
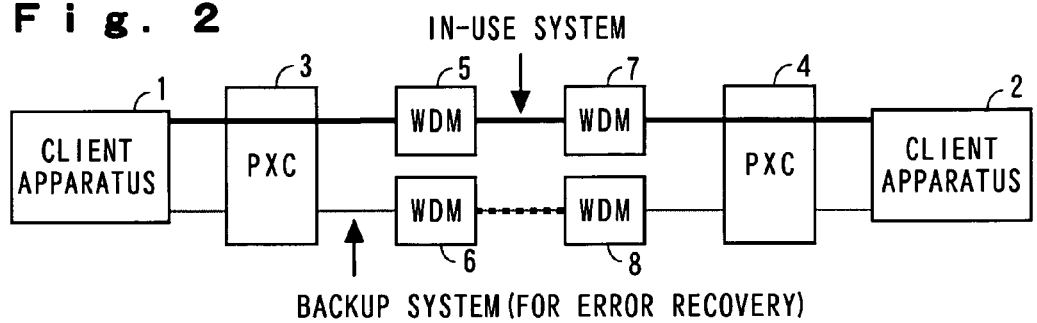
FIG. 2 is a block diagram of another basic construction of an optical network to which the invention is applied.

FIG. 2 is a block diagram of another basic construction of an optical network to which the invention is applied. This basic construction of the optical network is an example in which the client apparatus has a redundant construction and are used as wavelength path initiator node.

PXCs 3 and 4 are respectively connected to client apparatuses 1 and 2, transmission apparatus (hereinafter, referred to as WDMs) 5 and 6 are connected to the PXC 3, and WDMs 7 and 8 are connected to the PXC 4. For example, client apparatus 1—PXC 3—WDM 5—WDM 7—PXC 4—client apparatus 2 is set as an in-use system and client apparatus 1—PXC 3—WDM 6—WDM 8—PXC 4—client apparatus 2 is set as a backup system. Herein, when an error is detected in the in-use system, switching to the backup system is made. The thick line, the dashed line, and the thick dashed line of FIG. 2 indicate the same as those of FIG. 1.

Figure 3:
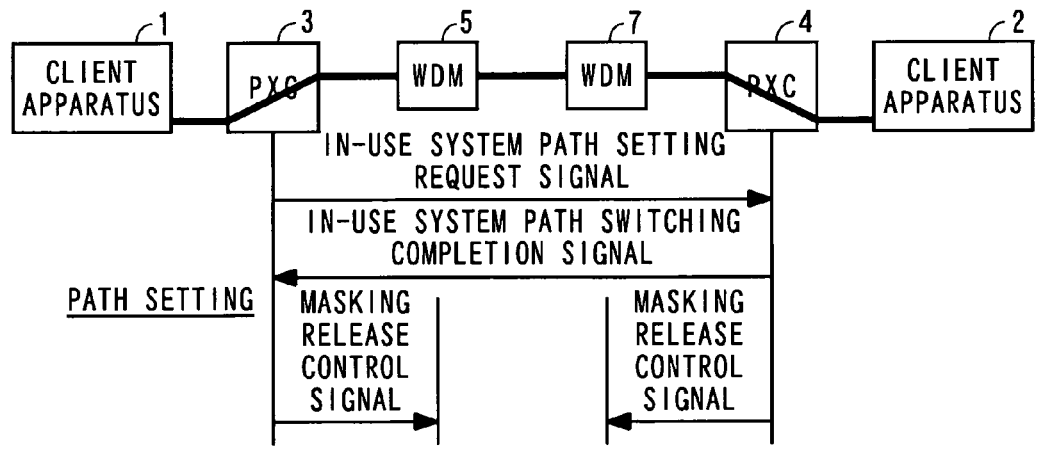
FIG. 3 is a block diagram for explaining operation when setting an in-use system path.
Figure 4:
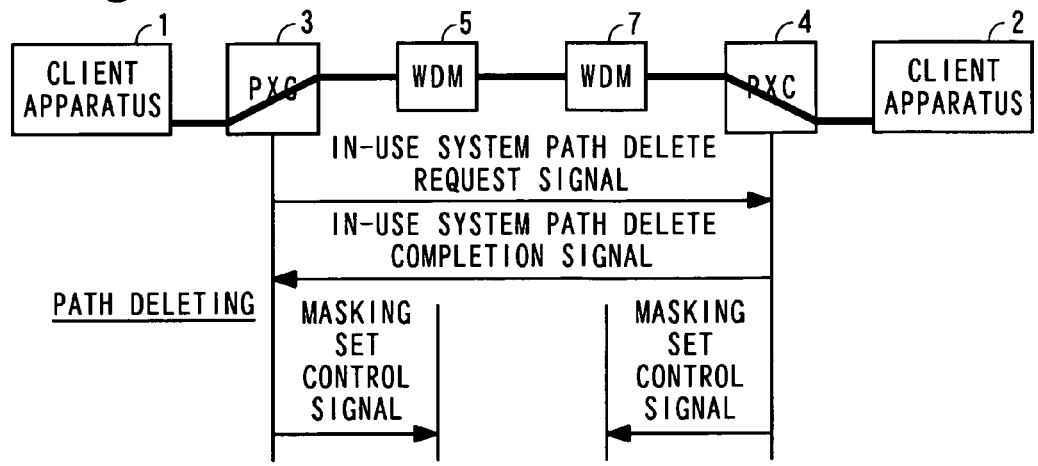
FIG. 4 is a block diagram for explaining operation when deleting an in-use system path.
Figure 5:
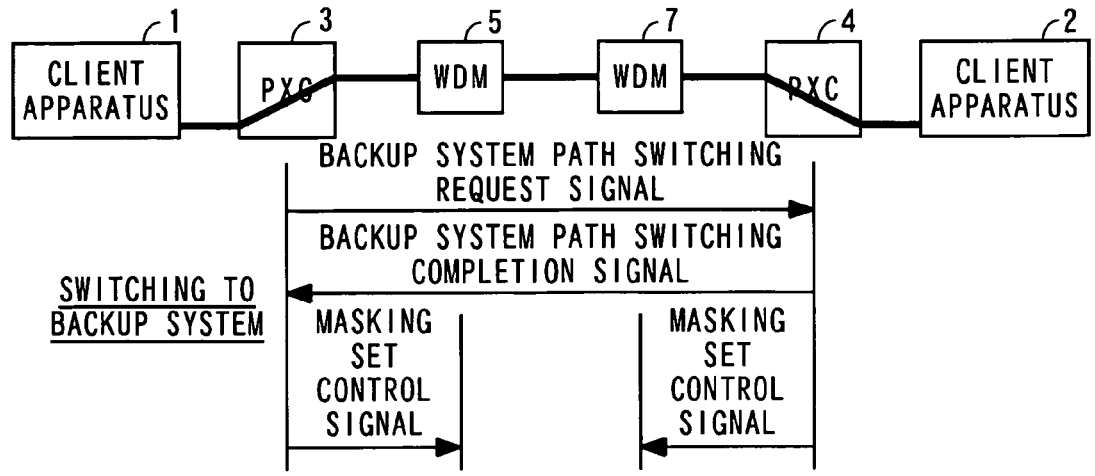
FIG. 5 is a block diagram for explaining operation when path switching from an in-use system to a backup system.
Figure 6:
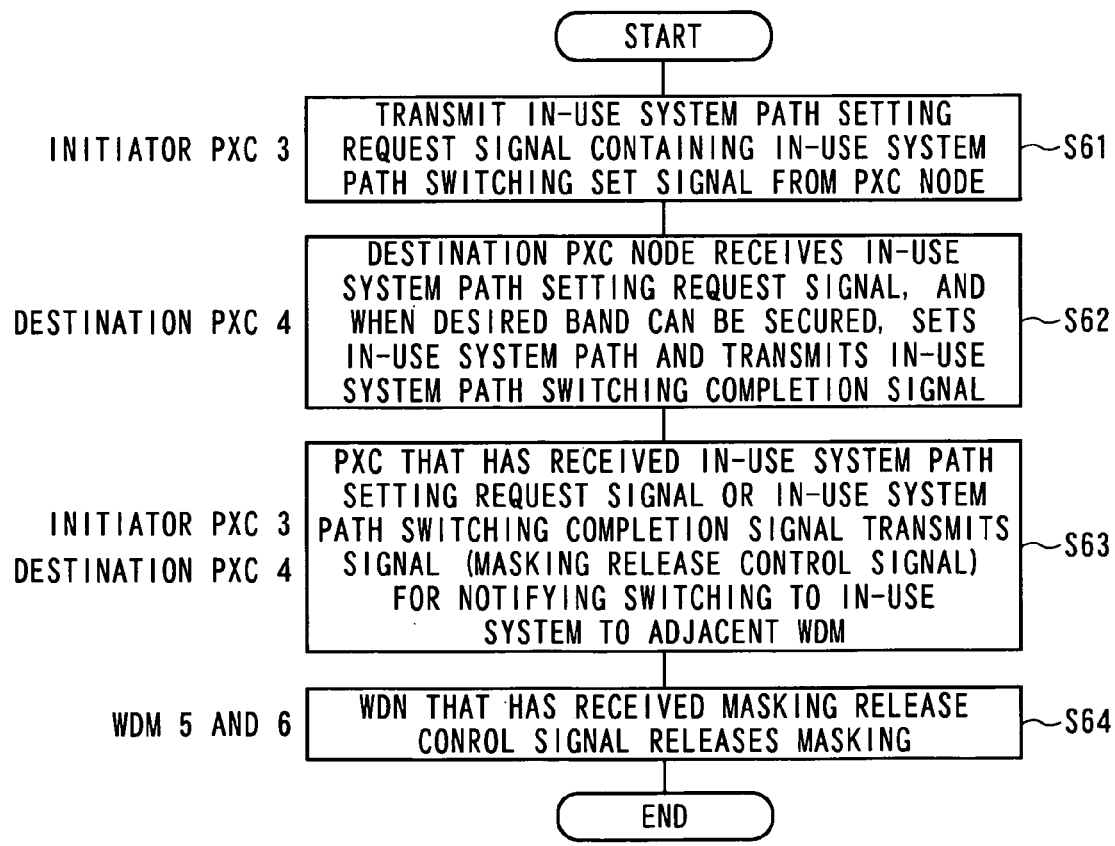
FIG. 6 is a flowchart of operation when setting an in-use system path.
Figure 7:
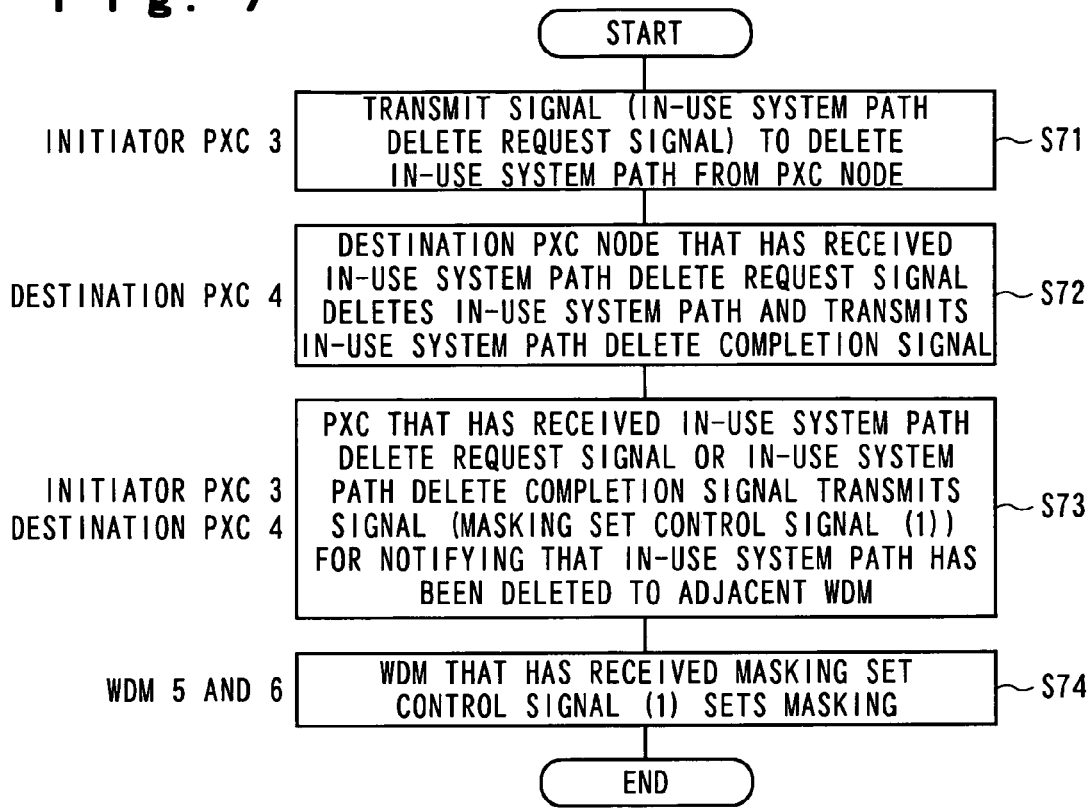
FIG. 7 is a flowchart of operation when deleting the in-use system path.
Figure 8:
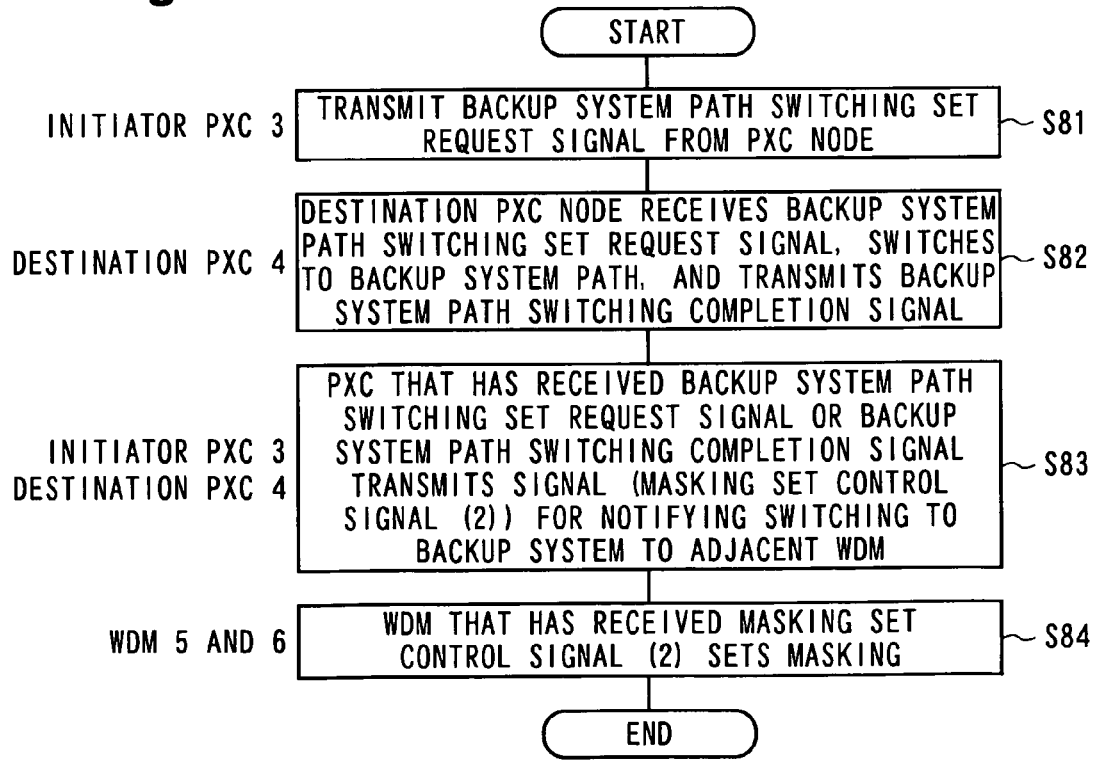
FIG. 8 is a flowchart of operation when path switching from an in-use system to a backup system.

FIG. 3 through FIG. 5 are block diagrams for explaining link operations of the WDMs 5 through 8 and PXCs 3 and 4 when the PXC 3 is a wavelength path initiator node, and FIG. 6 through FIG. 8 are flowcharts showing the operations.

First, operation when setting the in-use system path is explained with reference to FIG. 3 and FIG. 6. When setting the in-use system path, an in-use system path setting request signal containing an in-use system path switching set signal is transmitted from the PXC (initiator node) 3 (S61). The destination PXC (destination node) 4 receives the in-use system path setting request signal and sets the in-use system path that connects the WDM 7 to the client terminal 2, and transmits an in-use system path switching completion signal (S62). When setting the in-use system path, it is judged whether a band necessary for transmission of the optical signal from the client apparatus 1 can be secured in the link between the WDMs 5 and 7, and when this band can be secured, the in-use system path is set.

The PXC 3 receives the in-use system path switching completion signal. The PXC 4 that has received the in-use system path setting request signal and the PXC 3 that has received the in-use system path switching completion signal transmit masking release control signals respectively to the WDM 5 and 7 adjacent to themselves (S63). The masking release control signal is signal to notify the completion of the switching to the in-use system. The WDMs 5 and 7 receive the masking release control signals and release the masking to the PXCs 3 and 4 (S64).

When masking is released, the WDMs 5 and 7 become possible to detect errors between the PXCs 3 and 4 and the WDMs 5 and 7 depending on whether light is inputted from the PXCs 3 and 4 or not. Herein, when no light is inputted from the PXC 3 or 4, the WDM 5 or 7 judges that an error has occurred between the PXC 3 or 4 and the WDM 5 or 7 and transmits an error alarm to the monitoring system.

Next, operation when deleting the in-use system path is explained with reference to FIG. 4 and FIG. 7. When deleting the in-use system path, an in-use system path delete request signal is transmitted from the PXC (initiator node) 3 (S71). The destination PXC 4 (destination node) receives the in-use system path delete request signal and deletes the in-use system path, and transmits an in-use system path delete completion signal (S72).

The PXC 3 receives the in-use system path delete completion signal. The PXC 4 that has received the in-use system path delete request signal and the PXC 3 that has received the in-use system path delete completion signal transmit masking set control signals (1) respectively to the WDMs 5 and 7 adjacent to themselves (S73) The masking set control signal (1) is signal to notify that the in-use system path has been deleted. The WDMs 5 and 7 receive the masking set control signals (1) and set masking to the PXC 3 and 4 (S74).

When masking is set, the WDMs 5 and 7 do not judge that an error has occurred between the PXC 3 or 4 and the WDM 5 or 7 even if no light is inputted from the PXC 3 or 4. Therefore, an unintended error alarm is prevented from being transmitted to the monitoring system from the WDMs 5 or 7.

Next, operation when path switching from the in-use system path to the backup system path is explained with reference to FIG. 5 and FIG. 8. When switching the wavelength path from the in-use system path to the backup system path due to an error occurring in the in-use path, etc., a backup system path switching set request signal is transmitted from the PXC (initiator node) 3 (S81). The destination PXC 4 (destination node) receives the backup system path switching set request signal and switches the wavelength path from the in-use system path to the backup system path, and transmits a backup system path switching completion signal (S82).

The PXC 3 receives the backup system path switching completion signal. The PXC 4 that has received the backup system path switching set request signal and the PXC 3 that has received the backup system path switching completion signal transmit masking set control signals (2) respectively to the WDMs 5 and 7 adjacent to themselves (S83). The masking set control signal (2) is signal to notify the completion of the switching from the in-use system to the backup system. This may be the same as the masking set control signal (1) of FIG. 4. The WDMs 5 and 7 receive the masking set control signals (2) and set masking to the PXCs 3 and 4 (S84).

S81 through S84 are operations of the system that had been set as an in-use system, and the operations of the system that becomes the in-use system from the backup system due to the switching are the same as those when setting the above-described in-use system path with reference to FIG. 3 and FIG. 6, so that description thereof is omitted.

As described above, according to the invention, masking between PXC and WDM is set or released according to the in-use system path setting and deleting and the switching from the in-use system path to the backup system path, so that WDM included in the in-use system path properly transmits alarm to the monitoring system and WDM included in the backup system path does not transmit unintended alarm to the monitoring system.

Transmission and receiving of management information such as the masking release control signal and masking set control signal can be performed according to GMPLS protocol set on PXC and WDM.

Figure 9:
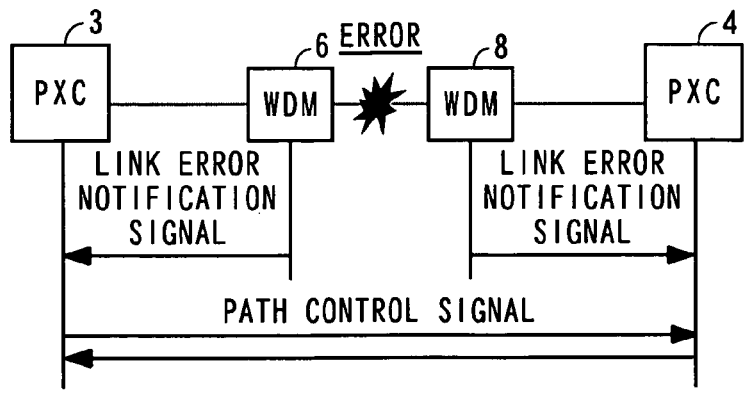
FIG. 9 is a block diagram of operation of link error notification of a backup system.
Figure 10:
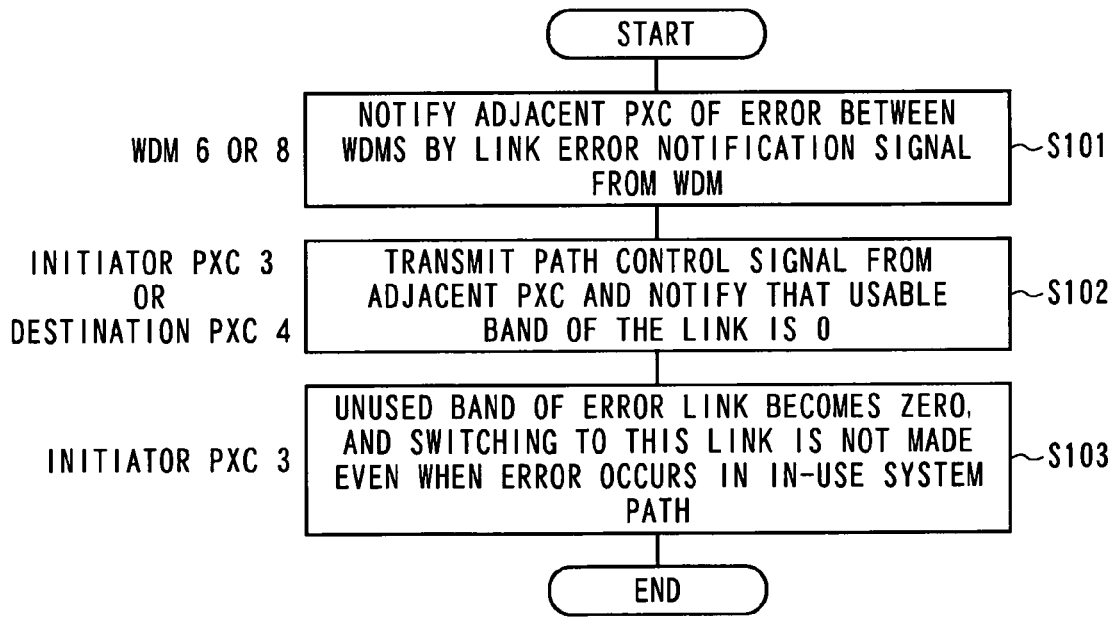
FIG. 10 is a flowchart of operation of link error notification of a backup system.

FIG. 9 is a block diagram of operation of link error notification of the backup system, and FIG. 10 is a flowchart of the operation. By this operation, PXC is notified of a link error between PXC and WDM of the backup system, and switching of the backup system in error to an in-use system can be prevented.

The PXCs 3 and 4 transmit and receive path control signals to and from each other according to the GMPLS protocol. Herein, when assuming that an error occurs in the link between the WDMs 6 and 8 of the backup system, the WDMs 6 and 8 detect the error and transmit link error notification signals to the PXCs 3 and 4 (S101). When receiving the link error notification signals, the PXCs 3 and 4 reflect the error on the path control signals and set the link usable band to 0 (S102). The PXCs 3 and 4 can detect the error between the WDMs 6 and 8 in advance, so that they prohibit the switching of the backup system to an in-use system (S103). Thereby, the PXC 3 of the initiator does not make wasteful switching to the backup system in error even when an error occurs in the in-use system.

The above description is in the case where PXC has a redundant construction and is wavelength path initiator node, and as shown in FIG. 2, when client apparatus has a redundant construction and become wavelength initiator node, an in-use system path setting request signal containing an in-use system path switching set signal and an in-use system path switching completion signal, an in-use system path delete request signal and an in-use system path delete completion signal, or a backup system path setting request signal and a backup system path switching completion signal are transmitted and received between the client apparatuses 1 and 2, directly or via the WDMs 5 and 7.

The client apparatus 1 or 2 transmits a masking release control signal to the WDM 5 or 7 when receiving an in-use system path setting request signal or an in-use system path switching completion signal, and transmits a masking set control signal to the WDM 5 or 7 when receiving an in-use system path delete request signal or an in-use system path delete completion signal, or a backup system path switching set request signal or a backup system path switching completion signal.

The WDM 5 or 7 releases the masking to the PXC 3 or 4 when receiving a masking release control signal, detects an error between the PXC 3 or 4 and the WDM 5 or 7 and properly transmit an alarm to the monitoring system. The WDM sets masking to the PXC 3 or 4 when receiving a masking set control signal and does not transmit an alarm to the monitoring system even when no light is inputted from the PXC 3 or 4.

The invention is also applicable to an optical network including PXCs and WDMs connected in multistages of three or more stages, and with the construction, masking between each PXC and WDM is set or released.

What is claimed is:

1. A link system for photonic cross connect and transmission apparatus in an optical network in which an in-use system path and a backup system path are set, wherein
   when an in-use system path is set based on an in-use system path setting request signal containing an in-use system path switching set signal, a photonic cross connect included in the in-use system path transmits a masking release control signal to an adjacent transmission apparatus included in the in-use system path based on an in-use system path setting completion signal, the photonic cross connect and the transmission apparatus links to each other and releases masking there between, and
   when an in-use system path is deleted based on an in-use system path delete request signal, a photonic cross connect included in the deleted in-use system path transmits a masking set control signal to an adjacent transmission apparatus included in the deleted in-use system path based on an in-use system path delete completion signal, the photonic cross connect and the transmission apparatus links to each other and sets masking therebetween.

2. The link system for photonic cross connects and transmission apparatus according to claim 1, wherein the transmission apparatus has a function of detecting a link error in the backup system path between the transmission apparatus by GMPLS protocols, and prohibits switching to a backup system path when the link error is in the backup system path.

3. The link system for photonic cross connect and transmission apparatus according to claim 1, wherein the photonic cross connect has a redundant construction.

4. The link system for photonic cross connect and transmission apparatus according to claim 1, wherein client apparatus externally connected to the photonic cross connect has a redundant construction.

* * * * *